J. R. SNYDER.
TRIPLE VALVE.
APPLICATION FILED APR. 27, 1912.
1,146,970.
Patented July 20, 1915.
2 SHEETS—SHEET 1.
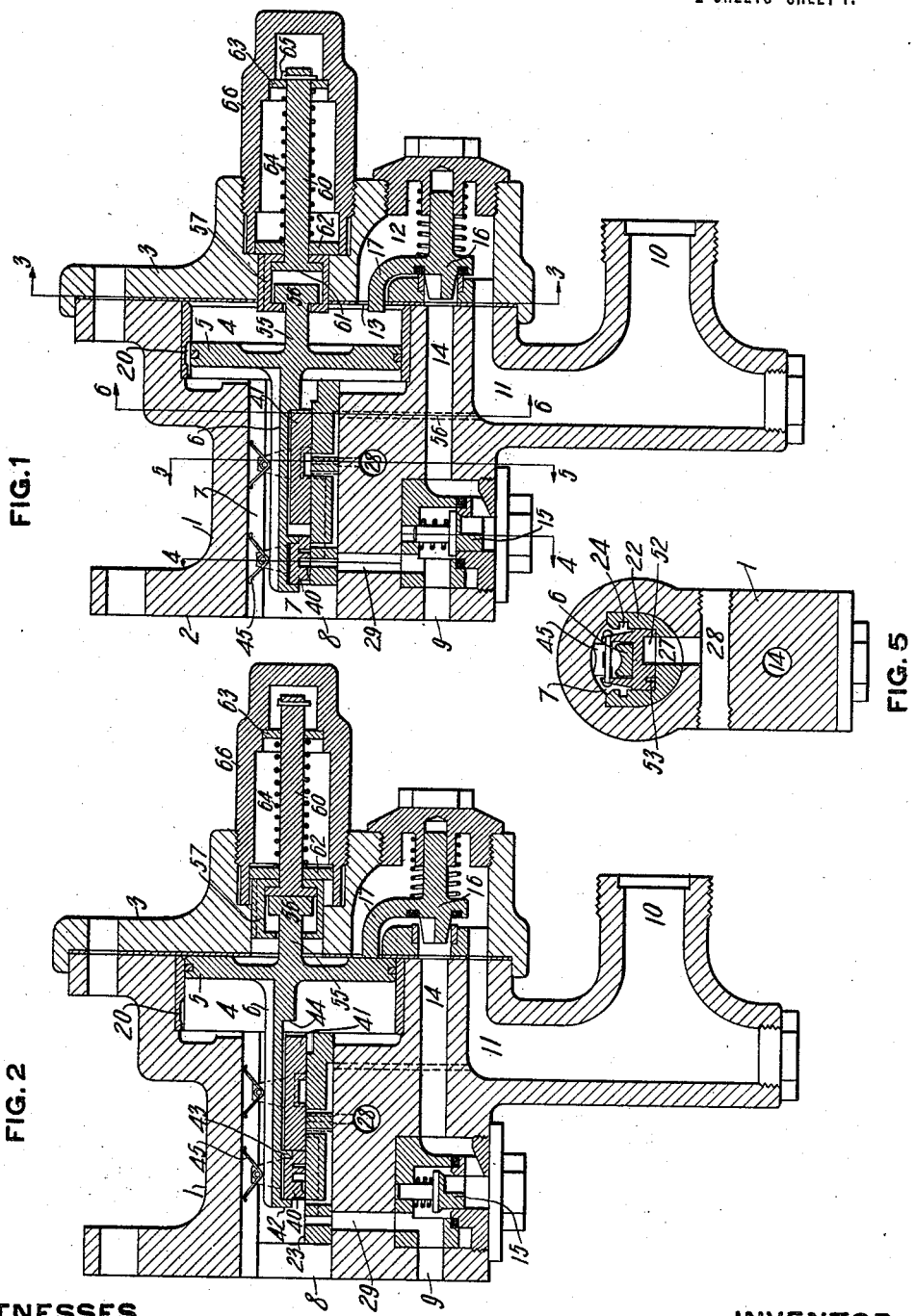

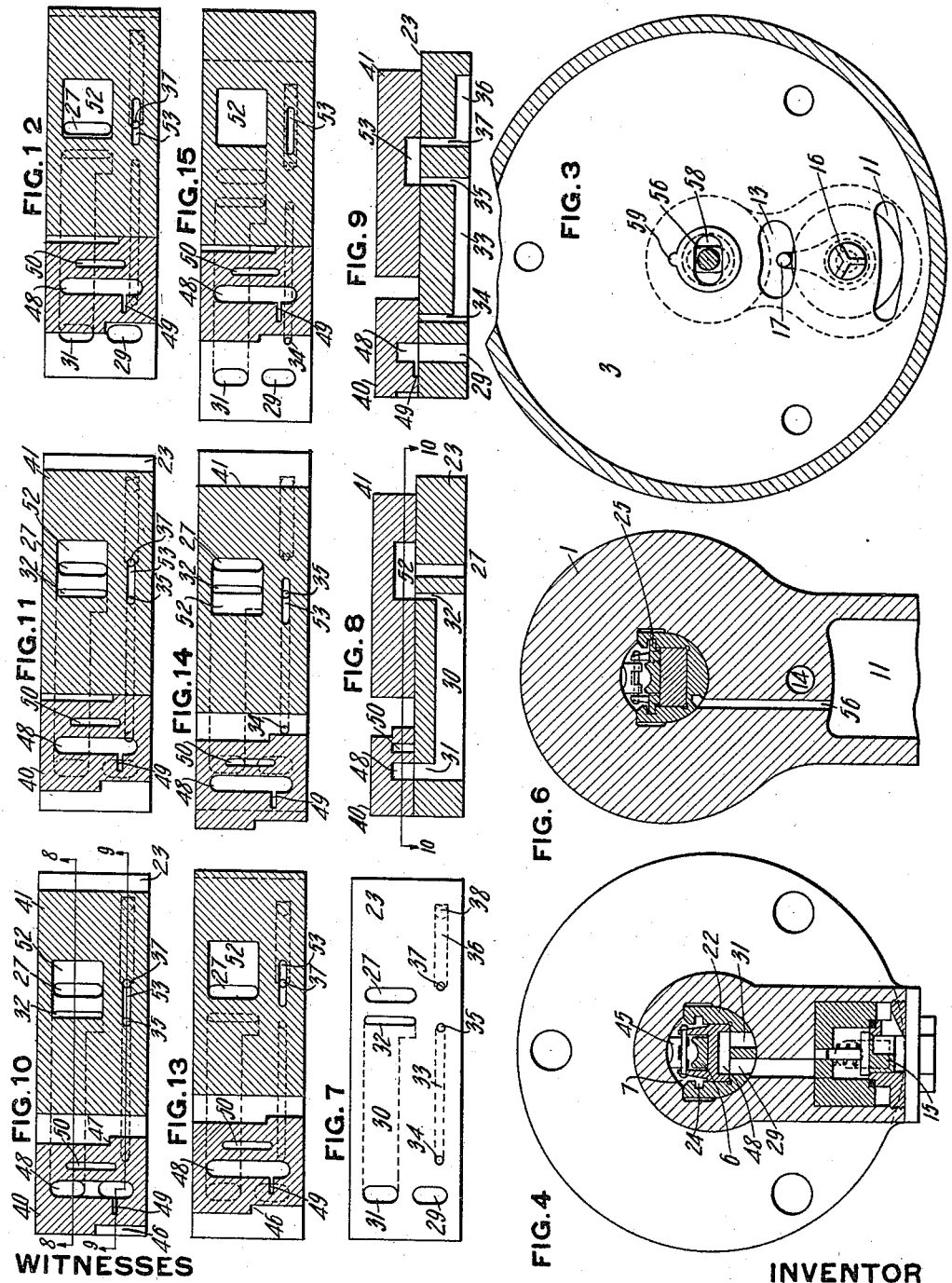

UNITED STATES PATENT OFFICE.

JACOB RUSH SNYDER, OF PITTSBURGH, PENNSYLVANIA, ASSIGNOR, BY MESNE ASSIGNMENTS, TO PITTSBURGH AIR BRAKE COMPANY, A CORPORATION OF PENNSYLVANIA.

TRIPLE VALVE.

1,146,970. Specification of Letters Patent. Patented July 20, 1915.

Application filed April 27, 1912. Serial No. 693,523.

*To all whom it may concern:*

Be it known that I, JACOB RUSH SNYDER, a resident of Pittsburgh, in the county of Allegheny and State of Pennsylvania, have invented a new and useful Improvement in Triple Valves, of which the following is a specification.

This invention relates to triple valves for air brake systems, and more particularly to triple valves for use on freight trains.

The object of the invention is to provide a triple valve which effects and performs all the usual functions and results of freight triple valves, and which performs and effects such functions and results by a much simpler and less complicated mechanical means than are embodied in the present type of freight triple valves for effecting the same results and functions.

The invention comprises the construction and arrangement of the parts of a triple valve hereinafter described and claimed.

In the accompanying drawings Figures 1 and 2 are longitudinal sections through a triple valve embodying the invention, taken substantially on the line 9—9 Fig. 10, Fig. 1 showing the same in full release or running position; Fig. 2, showing the same in emergency application position and Figs. 3, 4, 5 and 6 are vertical transverse sections taken respectively on the broken lines 3—3, 4—4, 5—5 and 6—6 on Fig. 1; Fig. 7 is a plan view of the slide valve seat; Figs. 8 and 9 are vertical longitudinal sections through the valve seat and the slide valve, Fig. 8 being taken on the line 8—8, Fig. 10, and Fig. 9 on the line 9—9, Fig. 10; and Figs. 10, 11, 12, 13, 14 and 15 are views showing the valve seat in plan and the valves in horizontal section on the line 10—10, Fig. 8, and showing different positions of the valve, Fig. 10 showing the same in full release position, Fig. 11 in quick service or quick serial application position, Fig. 12 in full service position, Fig. 13 in service lap position, Fig. 14 in retarded release and restricted recharging position, and Fig. 15 in emergency application position.

The valve in its general form, construction and arrangement follows the standard type of Westinghouse and similar valves. It comprises a casing 1 provided at one end with a flat face 2 for connection to the auxiliary reservoir and brake cylinder, and is closed at its opposite end by means of a head or cap 3 secured to the casing by compression bolts as is usual in triple valves. In said casing is the usual chamber 4 in which works the piston 5 provided with a stem 6 extending into the bore 7 of the casing and actuating the slide valves.

The auxiliary reservoir connection is at 8 and the brake cylinder connection at 9. The train or brake pipe connection 10 communicates through passage 11 with a chamber 12 in the head or cap 3, which chamber communicates at 13 with the piston chamber 4 and also communicates through passage 14 with the brake cylinder connection 9. In the passage 14 is a spring controlled check valve 15 seating toward the train pipe. Communication between chamber 12 and passage 14 is also controlled by check valve 16, spring seated toward the brake cylinder and provided with a curved arm 17 projecting through opening 13 into chamber 4 in position to be contacted by piston 5 when the latter moves to emergency application position, to thereby unseat valve 16 and permit train pipe pressure to pass through passage 14 directly to the brake cylinder, lifting valve 15 in its course.

The bushing of piston chamber 4 is provided with the auxiliary reservoir charging groove 20 having portions of different size, the outermost portion being the larger and being opposite the piston when the valve is in full release position, as shown in Fig. 1, while the inner portion thereof is more restricted and being opposite the piston 5 when the latter is driven fully over to the left-hand position, viewing Fig. 1, as occurs in retarded release and restricted recharging position. In the bore 7 of the piston valve is a suitable bushing 22 of general U-shape, as shown in Figs. 4, 5 and 6, and having its lowermost portion forming the valve seat 23. The inner sides of the vertical portions of the bushing are provided with longitudinal grooves 24 for receiving wings or ribs 25 on the piston stem 6 so as to provide a guide for the piston 5 and its stem.

The valve seat 23 is provided with the ports and passages indicated in Figs. 7, 8 and 9, to-wit a port 27 communicating with lateral port 28 leading to the atmosphere and forming the exhaust from the valve; a port 29 communicating directly with the brake cylinder port 9; a longitudinal passage 30 communicating at one end with port 31 located transversely in line with brake cylinder port 29 and at its opposite end communicating with port 32 located longitudinally in line with exhaust port 27; a longitudinal passage 33 communicating at one end with port 34 in proximity to brake cylinder port 29 and at its opposite end communicating with port 35; and a longitudinal passage 36 communicating at one end with port 37 in line with and in proximity with port 35, and at its opposite end communicating with port 38 extending down through the casing and communicating with the train pipe passage 11.

Coöperating with the valve seat are two slide valves, to-wit, a relatively small slide valve 40 and a larger slide valve 41. The slide valve 40 is held between an end projection 42 and an intermediate projection 43 on the stem 6 of the main piston so that said valve 40 at all times moves with the piston 5. The larger slide valve 41 is held between the intermediate projection 43 and a shoulder 44 on the main piston stem, but does not fill the space between said projection and shoulder, so that there is a certain amount of lost motion which permits the piston 5 to move at times without moving the valve 41. The slide valves are held to the seat by the usual springs 45.

The valve 40 in plan view is of a form shown in Figs. 10 to 15, being of general rectangular shape but slightly cut away at both ends, as indicated at 46 and 47. Said valve in its lower surface is provided with a large cavity 48 extending for a considerable distance widthwise of said valve but only a short distance lengthwise thereof, and having near one end the small longitudinal extension 49; and with a smaller cavity 50 adjacent to the cavity 48 but extending for a lesser distance both widthwise and lengthwise of said valve.

The larger slide valve 41 is of substantially rectangular form and is provided in its lower face with a pair of cavities, to-wit, a large, nearly square cavity 52 on one side and on the opposite side with a small narrow cavity 53 extending longitudinally of the valve.

On the outer face of main piston 5 is a stem 55 provided with an oblong head 56. Said head is engaged by a sleeve 57, provided in one end with an oblong opening 58 having its axis at right angles to the head 56, as shown in Fig. 3, and slidable but non-rotatable in the longitudinal bore in the head 3, such as by being provided with a rib 59 engaging a groove in the head. The opposite end of sleeve 57 is provided with an opening for the graduating stem 60, provided with head 61 lying inside of the sleeve and bearing against the outer end wall thereof. The graduating stem 60 is surrounded at its inner end by a follower 62 and at its outer end by a follower 63, between which followers is the graduating spring 64. The follower 63 is held on the end of the graduating stem by a suitable means, such as the pin 65. The followers 62 and 63 are guided for longitudinal movement in a fitting 66 having a threaded connection with the cap or head 3.

In assembling the parts the graduating stem 60 is inserted into sleeve 57 through the opening 58 therein, the head 61 of stem 60 being of a form to pass through opening 58, but not through the opening in the opposite end of the sleeve, which is preferably circular to correspond to stem 60. The follower 62, spring 64 and follower 63 are then placed on the stem 60, after which the fitting 66 is slipped over the followers and stem and the parts connected to the cap or head 3 by screwing fitting 66 thereinto. The cap or head 3 with the inserted parts are then connected to the triple valve stem 55 by bringing the axis of the opening 58 into line with the axis of the head 56, thereby enabling head 56 to pass into the sleeve 57, after which the cap 3 is given a partial turn to cause the head 56 to interlock in sleeve 57. To disassemble the parts the head or cap 3 must first be rotated to bring the axes of head 56 and opening 58 into registration, after which the cap or head 3 and connected parts can be removed.

The valve has six positions, as follows:

1. *Full release and recharging position.* (Shown in Figs. 1, 8, 9 and 10.)—In this position the main piston and valve are in the position shown in Fig. 1, with the head 56 of the piston stem bearing against the inner end wall of sleeve 57, and with graduating spring 64 resisting the further movement of the piston toward the left. In this position the piston 5 is opposite the large portion of recharging groove 20, so that train pipe air can pass from chamber 4 to the auxiliary reservoir. The slide valves 40 and 41 are in such position, shown in Fig. 10, that cavity 48 in the small slide valve 40 connects brake cylinder port 29 with port 31, while the large cavity 52 of slide valve 41 connects ports 32 and 27. Consequently the brake cylinder pressure is released to the atmosphere. All other ports are blanked. This position of the valve is assumed in normal running position, and after equalization of auxiliary reservoir and train pipe pressures, and permits of the rapid recharging of the auxiliary reservoir.

2. *Quick service or serial venting position.* (Shown in Fig. 11.)—This position is assumed upon the first movement of the main piston, due to reduction of train pipe pressure, and results in moving the smaller slide valve 40 from the position shown in Fig. 10 to that shown in Fig. 11, without moving the larger slide valve 41, due to the lost motion connection between the piston stem and said valve 41. In this position the connection between brake cylinder port 29 and port 31 is broken, and the cavity 48 with its extension 49 now connects small port 34 with brake cylinder port 29, while the cavity 53 in slide valve 41 connects ports 37 and 35, thereby permitting train pipe pressure coming through port 38 to enter the brake cylinder in a small stream. The result is that the train pipe is momentarily vented into the brake cylinder which is at atmospheric pressure, thereby producing a drop in pressure in the train pipe at the car and securing quicker serial action throughout the train. The effect is the same as though at each car the train pipe were momentarily vented to the atmosphere to secure quicker reduction of train pipe pressure toward the rear of the train than would be possible if all the air had to flow forwardly and out at the engineer's brake valve. Instead, however, of venting the train pipe at each car to the atmosphere, it is vented into the empty brake cylinder, thereby assisting in setting the brakes. The valve remains for a brief time in this position, due to the fact that the first movement of the piston 5 moves only the small slide valve 40 but as soon as the slack between the piston stem 6 and larger slide valve 41 is taken up the greater frictional resistance which is encountered momentarily checks the movement of the piston, thereby providing an appreciable time of venting the train pipe into the empty brake cylinder. The reduction of train pipe pressure caused by this venting into the brake cylinder unbalances the pressures on opposite sides of the piston 5 sufficiently to overcome the friction of both slide valves, so that the valve almost immediately moves to the next position now to be described.

3. *Full service position.* (Shown in Fig. 12.)—In this position the slide valves have moved to the right sufficiently so that the cut away portion 46 of small slide valve 40 uncovers brake cylinder port 29, thereby allowing auxiliary reservoir pressure to rush into the brake cylinder, all other ports meanwhile being blanked. In this position the head 56 of the piston stem is in contact with the end of graduating stem 60, the graduating spring 64 checking the movement of the piston and valve, as will be readily understood.

4. *Service lap position.* (Shown in Fig. 13.)—This position is assumed by the valve on a slight recoil, such as occurs immediately after a service application, due to a momentary overbalancing of pressure on the train pipe side of the piston. The large slide valve 41 remains stationary, due to the lost motion connection between itself and the piston stem, but the small slide valve 40 is moved over sufficiently to blank the brake cylinder port 29, thereby cutting off further flow of air from the auxiliary reservoir to the brake cylinder. All other ports remain blanked.

5. *Retarded release and restricted recharge position.* (Shown in Fig. 14.)—This position is assumed after an application by quickly charging the train pipe, thereby producing sufficient pressure to force the main piston 5 entirely over to the left, which requires graduating spring 64 to be compressed by follower 63 moving toward the left while follower 62 remains stationary. This brings the piston 5 opposite the restricted portion of recharging groove 20, so that the flow of train pipe air to the auxiliary reservoir is restricted, preventing the auxiliary reservoirs on the forward end of a long train from robbing the train pipe of air excessively, and permitting sufficient pressure to flow toward the rear end of the train so as to secure substantially simultaneous release of the brakes from front to rear. This position of the valve is assumed only on the forward portion of the train, while toward the rear end of the train the train pipe pressure has dropped (due to feeding the auxiliary reservoirs forward thereof) to such an extent that the triple valves go merely to full release position, shown in Fig. 1, being prevented from going further by graduating spring 64. In this position, also brake cylinder port 29 is connected with release port 31 through the small cavity 50 in slide valve 40, while release port 32 is connected to exhaust port 27 by the cavity 52 in slide valve 41. Consequently the release of the brakes is slightly retarded, which is just what is wanted at the forward end of the train to secure substantially simultaneous release from end to end of the train.

6. *Emergency application position.* (Shown in Figs. 2 and 15).—This position is assumed upon a large reduction of train pipe pressure, so that the auxiliary reservoir pressure will push piston 5 entirely over to the right, causing graduating spring 64 to be compressed by movement of follower 62, follower 63 in this case remaining stationary. In this position the slide valves have moved over so as to fully uncover brake cylinder port 29 and permit auxiliary reservoir pressure to rush to the brake cylinder, the same as in full service position. In addition, the piston 5 has contacted with the bent arm 17 on check valve 16, and has unseated said check valve against the resistance of its spring so that train pipe pressure can flow through passage 11, chamber 12 and passage 14 directly to the brake cylinder, lifting the check valve 15 in its passage. Consequently the brake cylinder is supplied with air not only from the auxiliary reservoir but also from the train pipe, thereby securing a quick serial action of the brakes throughout the train by reduction of train pipe pressure at each car. As soon as the brake cylinder pressure overcomes the train pipe pressure the check valve 15 closes, and thereafter the application is completed by the equalization of auxiliary reservoir pressure into the brake cylinder.

The emergency position of the valve can be secured either directly from the full release position or from any of the other positions of the valve by merely reducing the train pipe pressure below the point of equalization of auxiliary reservoir pressure in the brake cylinder.

The spring 64, it will be observed, with followers 62 and 63, is so arranged that the spring becomes active in both directions, being put under compression when the piston moves fully over toward the right in emergency application, and also when the piston is driven fully over toward the left upon sudden increase of train pipe pressure in retarded release and recharging position. In all other positions of the valve said spring is not put under compression.

The valve described has all of the usual functions of triple valves, including a quick service or serial venting position to secure the rapid serial action of the brakes throughout the train in service as well as in emergency positions and also a retarded release and restricted recharging position, in addition to the usual service and emergency application positions, as well as enabling the brakes to be held in any of the positions, by lapping the valve. The valve therefore performs all of the functions of the most approved triple valves, but by a mechanical construction which is very much simpler and less complicated than that of existing valves which perform all of the functions of this valve. Consequently the valve is not only cheaper in first cost, but is more reliable in action, less liable to get out of order, cheaper to keep up, and offers less resistance to movement than similar valves for securing the same functional effects.

What I claim is:

1. A triple valve having connections to the train pipe, brake cylinder and auxiliary reservoir, a movable abutment actuated by variations in train pipe pressure, tandem slide valves actuated thereby, ports and passages controlled by said valves and arranged on light reduction in train pipe pressure to open a small communication directly from the train pipe to the brake cylinder, and a valve independent of the slide valves and controlling a larger communication directly from the train pipe to the brake cylinder and arranged on emergency reduction of train pipe pressure to be opened.

2. A triple valve having connections to the train pipe, brake cylinder and auxiliary reservoir, a movable abutment actuated by variations in train pipe pressure, a slide valve actuated by said movable abutment and controlling ports and passages arranged on service reduction in train pipe pressure to first open a small communication from the train pipe to the brake cylinder and then break said communication and open communication from the auxiliary reservoir to the brake cylinder, and a valve independent of said slide valve and arranged in emergency position of the movable abutment to open a large communication directly from the train pipe to the brake cylinder.

3. A triple valve having connections to the train pipe, brake cylinder and auxiliary reservoir, a movable abutment actuated by variations in train pipe pressure, a slide valve actuated thereby and controlling communication between the auxiliary reservoir and brake cylinder and between the brake cylinder and the atmosphere and arranged on light reduction of train pipe pressure to open a small communication from the train pipe directly to the brake cylinder, and a valve controlling a larger communication from the train pipe to the brake cylinder and arranged to be contacted by the movable abutment and opened thereby when the latter moves to emergency position.

4. A triple valve having connections to the train pipe, brake cylinder and auxiliary reservoir, a movable abutment actuated by variations in train pipe pressure, a pair of slide valves actuated thereby, one of said slide valves having a lost motion connection with the piston, the last named valve being provided with a cavity arranged in full release position to connect a port communicating with the train pipe with a port leading to the valve seat underneath the other of said slide valves, said other slide valve having a cavity arranged in full release position to connect a brake cylinder port with a release or exhaust port, and upon movement under slight reduction of train pipe pressure to blank said last named connection and connect the port controlled by the lost motion slide valve with the brake cylinder.

5. A triple valve having connections to the train pipe, brake cylinder and auxiliary reservoir, a movable abutment actuated by variations in train pipe pressure, a slide valve actuated thereby and provided with a pair of cavities, one arranged upon gradual increase of train pipe pressure to open a large communication between the brake cylinder and the atmosphere, and the other arranged upon a greater increase in train pipe pressure to open a restricted communication between the brake cylinder and the atmosphere.

6. A triple valve having connections to the train pipe, brake cylinder and auxiliary reservoir, a movable abutment actuated by variations in train pipe pressure, a slide valve actuated thereby and provided with a pair of cavities, one being arranged upon gradual increase of train pipe pressure to open a large communication between the brake cylinder and the atmosphere, and the other being arranged upon a greater increase in train pipe pressure to open a restricted communication between the brake cylinder and the atmosphere, and differential feed grooves controlled by the piston and so arranged that the larger of said grooves is open when the brake cylinder is connected to the atmosphere through the large passage and the smaller of said grooves is open when the brake cylinder is in communication with the atmosphere through the restricted passage.

7. In a triple valve, a valve seat provided with a port connecting with the brake cylinder, a port located laterally of said brake cylinder port and connecting with the atmosphere, and a slide valve coöperating with said seat and provided with a pair of cavities of different sizes and arranged in one position to connect the brake cylinder and release ports through the large cavity and in another position to connect said brake cylinder and release ports through the small cavity.

8. In a triple valve, a casing having connection to a train pipe, an auxiliary reservoir, a brake cylinder and the atmosphere, a movable abutment actuated by variations in train pipe pressure, a valve actuated by said movable abutment and provided with a pair of cavities of different sizes and arranged upon gradual increase of train pipe pressure to connect the brake cylinder to the atmosphere through the larger of said cavities and upon sudden increase in train pipe pressure to connect the brake cylinder to the atmosphere through the smaller of said cavities.

9. In a triple valve, a casing, a valve seat in said casing provided with a port leading to the brake cylinder, a port leading to the atmosphere, and a port connecting with the train pipe, a movable abutment in said casing actuated by variations in train pipe pressure, a valve operated by said abutment and coöperating with said seat and provided with a large and with a small cavity, said large cavity provided with a longitudinal extension, said cavities being so arranged that upon gradual increase in train pipe pressure the large cavity connects the brake cylinder port to the atmosphere, upon sudden increase of train pipe pressure the small cavity connects the brake cylinder port to the atmosphere, upon initial movement under reduction of train pipe pressure said large cavity and extension connect the train pipe port to the brake cylinder port, and upon further movement in the same direction the auxiliary reservoir is connected with the brake cylinder port.

10. In a triple valve, a valve seat provided with a port connecting with the brake cylinder, a release port in proximity thereto and connected to a second release port, an exhaust port in proximity to the last named release port, and a pair of slide valves coöperating with said seat and having movement relative to each other, one being provided with a cavity arranged to connect the brake cylinder port and one of said release ports and the other having a cavity arranged to connect the other release port and the exhaust port.

11. In a triple valve, a valve seat provided with a port connecting with the brake cylinder, a release port laterally in proximity thereto and connected to a second release port, an exhaust port in proximity to the last named release port, and a pair of slide valves coöperating with said seat and having movement relative to each other, one of said slide valves being provided with a pair of cavities of different sizes located one in advance of the other and arranged in one position to connect the brake cylinder port and the first named release port through the large cavity and in another position to connect said brake cylinder port and release port through the small cavity, and the other of said slide valves having a cavity arranged to connect the second release port with the exhaust port.

12. In a triple valve, a valve seat provided with a port connecting with the brake cylinder, a release port in proximity thereto, a train pipe port located in longitudinal relation to the brake cylinder port, and a pair of small ports connected by a longitudinal passage, one of said ports being in proximity to the train pipe port and the other being in proximity to the brake cylinder port, and a pair of slide valves coöperating with said seat and having movement relative to each other, one being provided with a cavity arranged in one position to connect the brake cylinder port with the release port and having an extension to said cavity arranged in another position of the valve to connect the brake cylinder port with the small port in proximity thereto, and the other valve having a cavity arranged when the first named valve is in the second named position to connect the train pipe port with the small port in proximity thereto.

13. In a triple valve, a valve seat provided with a port communicating with the brake cylinder, a release port laterally in proximity thereto and connected to a second release port, an exhaust port in proximity to the last named release port, a train pipe port, a pair of small ports connected by a longitudinal passage, one in proximity to the train pipe port and the other in proximity to the brake cylinder port, and a pair of slide valves coöperating with said seat and having movement relative to one another, one of said slide valves being provided with a large cavity arranged in one position of the valve to connect the brake cylinder port with the first named release port, said cavity having an extension arranged in another position of said valve to connect the brake cylinder port with the small port in proximity thereto, and the other of said valves being provided with a cavity arranged when the first named valve is in the second named position to connect the train pipe port with the small port in proximity thereto, said first named valve being provided with a smaller cavity arranged in a different position of the valve to connect the brake cylinder port with the first named release port.

14. A triple valve comprising a piston and a slide valve actuated thereby, a graduating stem connected to said piston in a manner to permit limited movement of the piston without moving said stem, and a spring arranged to resist movement of said stem in both directions.

15. A triple valve comprising a casing, a piston therein provided with a stem having an oblong head, a cap closing the end of said casing, a graduating stem carried thereby and having on its inner end a sleeve provided with an oblong opening thereinto arranged to receive the oblong head on the piston stem and to be locked thereto by a partial turn of said cap.

16. A triple valve comprising a casing, a piston therein for actuating the valve, a cap or head closing one end of said casing and removably secured thereto and capable when released therefrom of being rotated, and a graduating stem carried by said cap or head, the inner end of said graduating stem and the piston being provided with interlocking means arranged to be engaged and disengaged by a partial turn of one relative to the other.

In testimony whereof, I have hereunto set my hand.

JACOB RUSH SNYDER.

Witnesses:
F. W. WAITER,
WILLIAM B. WHARTON.

Copies of this patent may be obtained for five cents each, by addressing the "Commissioner of Patents, Washington, D. C."